No. 682,862. Patented Sept. 17, 1901.
H. H. SCHENK.
TRACTION EXCAVATING MACHINE.
(Application filed June 26, 1899.)
(No Model.) 6 Sheets—Sheet 1.

Fig. 7.

Witnesses
Geo. A. Byrne
C. E. Hebb

Inventor
Henry H. Schenk.
by Frank S. Appleman
Attorney

No. 682,862. Patented Sept. 17, 1901.
H. H. SCHENK.
TRACTION EXCAVATING MACHINE.
(Application filed June 26, 1899.)
(No Model.) 6 Sheets—Sheet 3.

No. 682,862. Patented Sept. 17, 1901.
H. H. SCHENK.
TRACTION EXCAVATING MACHINE.
(Application filed June 26, 1899.)
(No Model.) 6 Sheets—Sheet 5.

Witnesses
Inventor
Henry H. Schenk.
Attorney

UNITED STATES PATENT OFFICE.

HENRY H. SCHENK, OF MEMPHIS, MISSOURI.

TRACTION EXCAVATING-MACHINE.

SPECIFICATION forming part of Letters Patent No. 682,862, dated September 17, 1901.

Application filed June 26, 1899. Serial No. 721,902. (No model.)

*To all whom it may concern:*

Be it known that I, HENRY H. SCHENK, a citizen of the United States, residing at Memphis, Scotland county, State of Missouri, have invented a new and useful Traction Excavating-Machine; and I hereby declare the following specification and accompanying drawings to be a full and clear description of the invention, such as will enable others skilled in the art to which it appertains to make and use the same.

The object of this invention is to produce an excavating-machine having great capacity of simple construction and manipulation in order that excavating may be done at a minimum cost.

A further object of the invention is to make a portable excavator that can readily be adjusted to make a cut at one through of any desired depth up to one and one-half times its height and of any width up to three times its width.

A still further object of the invention is to produce an excavating-machine having novel mechanism whereby the slope of the ditch may be produced automatically.

By having the machine cut wider than itself a smooth solid bottom is formed for the propelling and supporting trucks by which I can turn the machine either way or move it up or back from the working face of the ditch or excavation.

Another leading feature of my machine is the provision of means for its propulsion in the bed of its own cut while the excavator is cutting and delivering the material cut to a spoil-bank, car, or dumping-wagon.

In making excavations of great width two or more machines side by side may be employed to cut the full width at one time, or one machine may be used by operating it back and forth across the working face of the cut, thereby cutting a transverse section of the face of the cut at each through.

An excavator of the character noted may be used at nearly any kind of excavating-work in nearly any kind of material and conditions. It is especially adapted for railway-work or in cutting artificial waterways, building levees, and cutting canals, tunnels, and the like.

With the above and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts in the several views, and in which—

Fig. 2 is a view in elevation taken from the rear end with the conveyer turned at a right angle to the length of the excavator. Fig. 15 is a view in elevation of the rear truck detached.

In the drawings, A indicates the frame of the excavating-machine, supported in front by a frame 1, having at its forward end the castings 2, having integral extensions 3, which are pivoted in the frame A. One of the castings forms a bearing for the shaft 4, which projects at one side of the frame and has mounted thereon a worm-wheel 5. The inner end of the shaft carries a worm 6, meshing with a rack 7, secured on the under surface of the circular bar 8, said bar being free to slide in the L-shaped truck-frame 9. Bearings 10 are bolted to the circular bar 8 and have journaled therein the trunnions 11 of the ground-wheel 12. A crank 13 extends upwardly and rearwardly and is journaled in suitable brackets 14 on the frame. The lower end of the crank carries a worm 15 for rotating the worm-wheel 5 and shaft 4. As the worm 6 is operated by the shaft the rack-bar 8 is turned and the front portion of the machine is thus guided.

The elevation of the front of the machine can be regulated within certain bounds by means of the cables 16, which run over a drum 17, journaled in the frame A. A worm-wheel 18 is keyed on the shaft of the drum, and a crank $19^a$, journaled in brackets $20^a$, carries a worm $21^a$ for rotating the worm-wheel 18 and the drum 17, whereby the cables are wound and unwound. By winding cables the rearward extension of the frame to which the cables are secured is lowered, and as the supporting-frame is fulcrumed on the trunnions of the wheel 12 the forward end of the machine is elevated, and vice versa.

The rear truck, which is the power-truck, is connected to the frame A by a shaft 19, said shaft being journaled in bearings on beam 20, one at each side of the machine, but one of which is shown. Shafts 21 are journaled in the beams 20 and carry sprocket-wheels 22. Sprocket-wheels 23 are keyed on the shaft 19, between the beams 20, and sprocket-wheels 24 are keyed to the ends of the shaft 19, which protrudes beyond the side of the frame. Power is transmitted to the shaft 19 through sprocket-wheels 24, sprocket-chains 25, and sprocket-wheels 26, which latter are keyed to the shaft 27, which also carries sprocket-wheel 32, gear-wheel 32' and gear-wheel 33, and clutch 35.

A traction-belt which acts with the sprocket-wheels between the truck-beams consists of a series of pivotally-connected links $28^a$, to which I bolt the tread-surface irons $29^a$, T shape in cross-section. By the rotation of the shaft 19 the sprocket-chain formed by the links $28^a$ is driven, and the movement of the machine in either direction is accomplished by controlling the rotation of the shaft 27.

A sprocket-wheel 30 on the shaft 29 of the engine drives a sprocket-chain 31, running over a sprocket-wheel 32, cast in one piece with 32' and running loose on a shaft 27. The sprocket-wheel 32 is formed with a hub of the gear-wheel 32', which is free to rotate on the shaft. Bevel gear-wheels 32' 33 are loose on the shaft 27, and their hubs are provided with clutch-teeth 34. A clutch 35 is splined on shaft 27. The clutch 35 is moved into engagement with either of the gear-wheels 32' 33 by means of a lever 36, extending above the top of the frame. Said lever is here shown as connected to the central lever 37 through the agency of a link 38. As the wheel 32' is on the hub of wheel 32 and as wheel 32 is positively driven, the wheels 32' and 33 will by reason of the action of wheel 121 be rotated in opposite directions. Hence by moving the clutch 35 into engagement with either wheel the shaft 27 will be rotated in the direction the wheel is moving with which the clutch engages, and by this means the rear truck, through the connections with the wheels 26 on the shaft 27, is moved forward or rearward.

The engine 28 may be of any desired type or construction. The power-shaft 29 of the engine protrudes to one side of the frame and carries a sprocket-wheel 39. A shaft 40, journaled at the top of the frame, has a sprocket-wheel 41, driven by the chain 42 from the sprocket-wheel 39. The cutter-head 43 is mounted on a shaft 44, which extends on an incline from a point slightly in front of the shaft 40 to the front of the machine. A short shaft 45 is supported in two transverse beams 46 47, and the shaft 44 is connected to the short shaft 45 by a knuckle 48. The short shaft is driven by a gear-wheel 49 on the shaft 40 engaging a gear-wheel 50 on the short shaft. Near the front end of the machine the shaft 44 is provided with a movable support 51, having a flexible boxing 52. The support comprises two side plates 53, bolted to form a housing. Journaled in the housing are pinions 54 55. The pinion 55 is rotated by the shaft 56, which extends in an incline from a point slightly in front of the shaft 40 to the housing. The shaft 56 is connected by a knuckle 57 to a short shaft 58, journaled in the cross-beams 46 and 47. The inner end of the shaft 58 carries a gear-wheel 59, meshing with two beveled gear-wheels 60 and 61, mounted loosely on the shaft 40, and a lever 63 is connected to the clutch for throwing it out of engagement with either of the wheels 60 or 61. By the action of the clutch and the gearing described the direction of rotation of the shaft 56 is determined and the motion of said shaft 56 is communicated to the pinion 55. The pinions 54 and 55 are adapted to mesh with a curved rack-bar 64, over which the support is made to travel. The rack-bar is T-shaped in cross-section, and rollers 65, journaled on pins $65^a$ in the housing, engage the under surfaces of the head of the rack-bar and prevent displacement of the support. The rack-bar 64 is carried by a frame consisting of a horizontal member 66 and two vertically-disposed I-beams 67, attached at each end of the horizontally-disposed member. The I-beams 67 have toothed surfaces 68, which are engaged by pinions 69. The pinions 69 are rotated on a shaft 70, and the shaft is journaled in bearings attached to the frame A. The frame carrying the rack-bar is reciprocated between guides 71 and 72 of the frame A. Idlers 73 are mounted on arms 74. The arms 74 are secured to a portion of the frame A, and the idlers operate against the surfaces of the I-beams opposite to the toothed surfaces for supporting the frame. The shaft 70 is provided with a worm-wheel 75, and a worm 76 on a shaft 77 meshes with the worm-wheel. The forward end of the shaft 77 is journaled in a double bearing 78, and the rear end carries a beveled gear-wheel 79. Gear-wheels 80 and 81, loose on the shaft 40, are under the control of a clutch 82, and the clutch in turn is under the control of the lever 83. By employing the clutch in connection with the bevel gear-wheels it is obvious that the shaft 77 may be rotated in alternate directions, and such alternate rotation will result in the reciprocating of the frames of the rack-bar through the worm and its wheel, the shaft 70, the pinions 69, and the teeth 68 of the I-beams.

In order to automatically direct the movement of the cutter-head from side to side and vertically, I provide mechanism under the control of the shafts 44 and 56 for moving the clutches 62 and 82 that the direction of rotation of the shafts 56 and 70 may be altered. To this end I provide a frame cross-bar 84, supported by the frame A. A bell-crank lever 85 is pivoted to the cross-bar 84 by a pin 86, one end of the bell-crank engaging a lever 87, fulcrumed at 88, said lever being connected at the opposite end to the clutch 82, heretofore described. The end 89 of the bell-crank has an angular extension working in a slot 90, formed in the upper rail 91 of the frame, which is moved vertically by the shaft 44 of the cutter-head coming in contact with the bars 92 93, adjustable by means of the apertures and pins on the bars 95 and 96. The bars 94 are adjustably secured to the bars 92 and 93 and communicate motion to rail 91. In order to limit the transverse sweep of the cutter-shaft, the bars 94 are adjustably secured to the bars 92 93, and as the shaft 44 contacts with them the frame is swung from side to side on the transverse beam 97. An arm 98, carried by the frame, is passed through a hole in a lever 99, said lever being fulcrumed at 100, and fastened to its opposite end is the clutch 62, the function of which has been explained, and through the momentum of the sliding frame and the lever the said clutch is thrown into engagement with one or the other of the gear-wheels. When the mechanism is set to operate automatically, the dogs in the levers 63 and 83 are withdrawn from engagement with the racks and are held in such position in any suitable manner. The degree of inclination of the bars 94 will determine the slant or curve of the sides of the excavation. The cross-beam which supports the shifting frame is connected to the frame by means of the swinging arms 101, pivoted on the bolts 102, and provided with weights 103.

Figure 1:
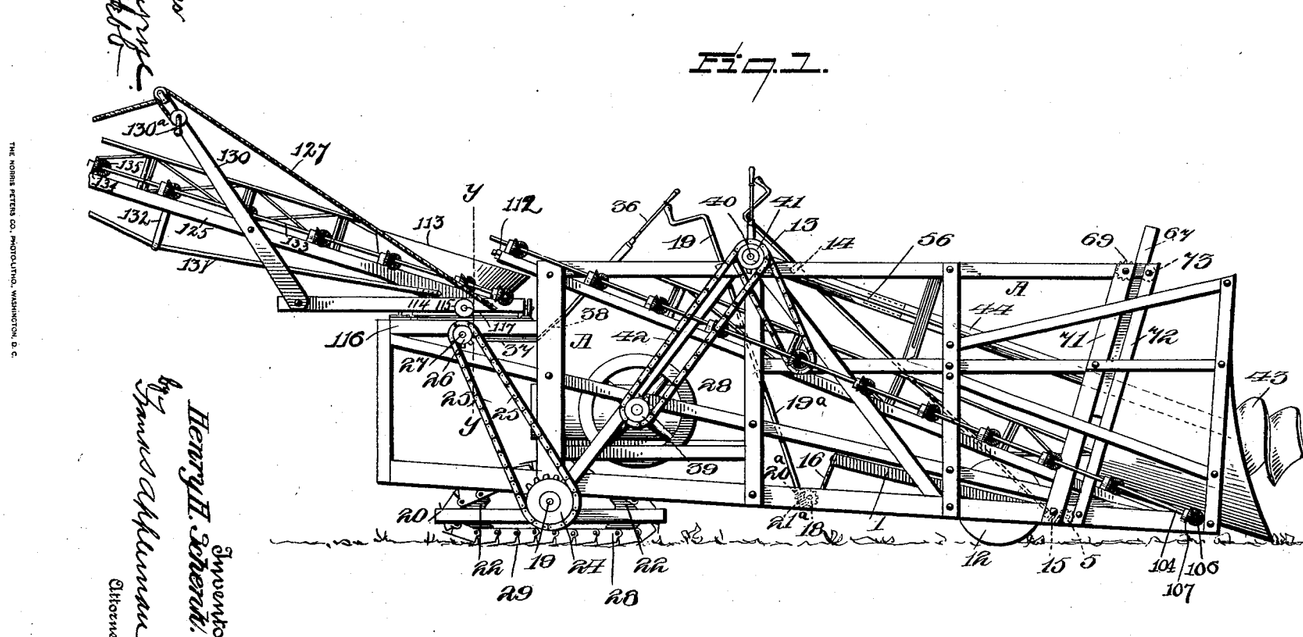
Figure 1 is a view in side elevation of the excavating-machine and conveyer.
Figures 3, 4:
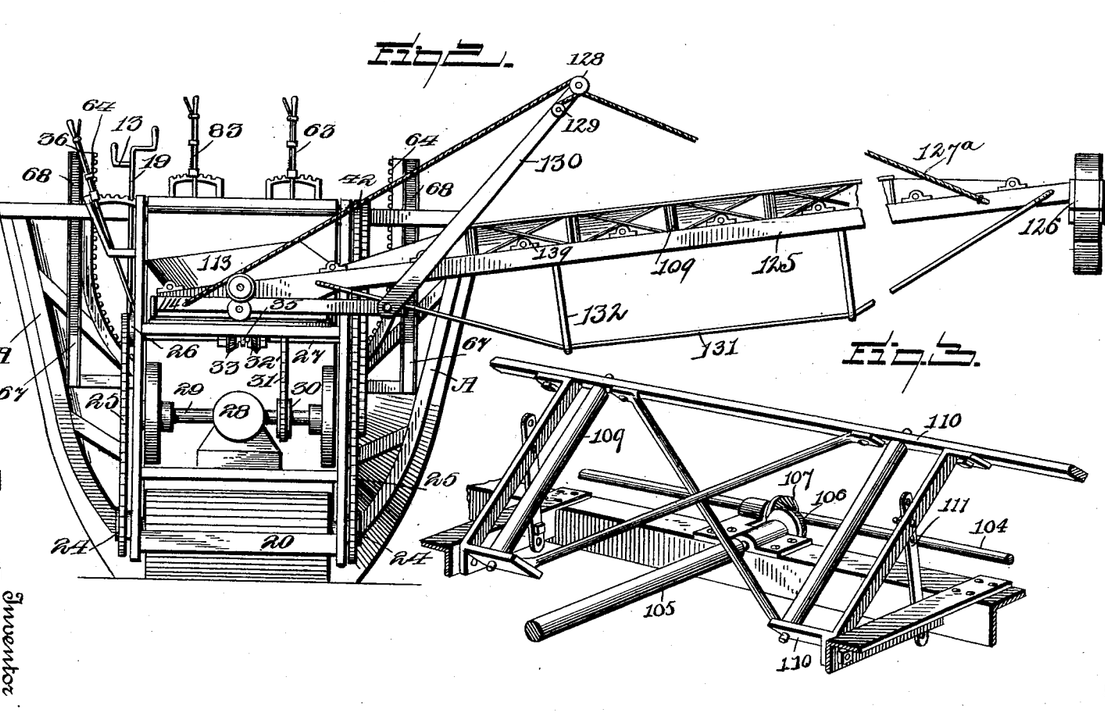
Fig. 3 is a view in perspective of a section of the conveyer.
Fig. 4 is a view in elevation of the gearing for driving the auger or cutting-head and for driving and reversing the auger-shifting mechanism.
Figure 4:
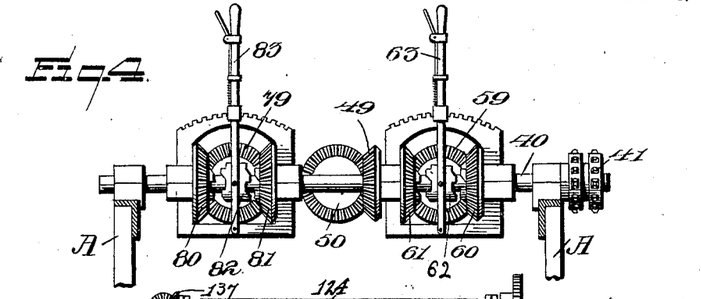
Figures 5, 8, 9, 10:
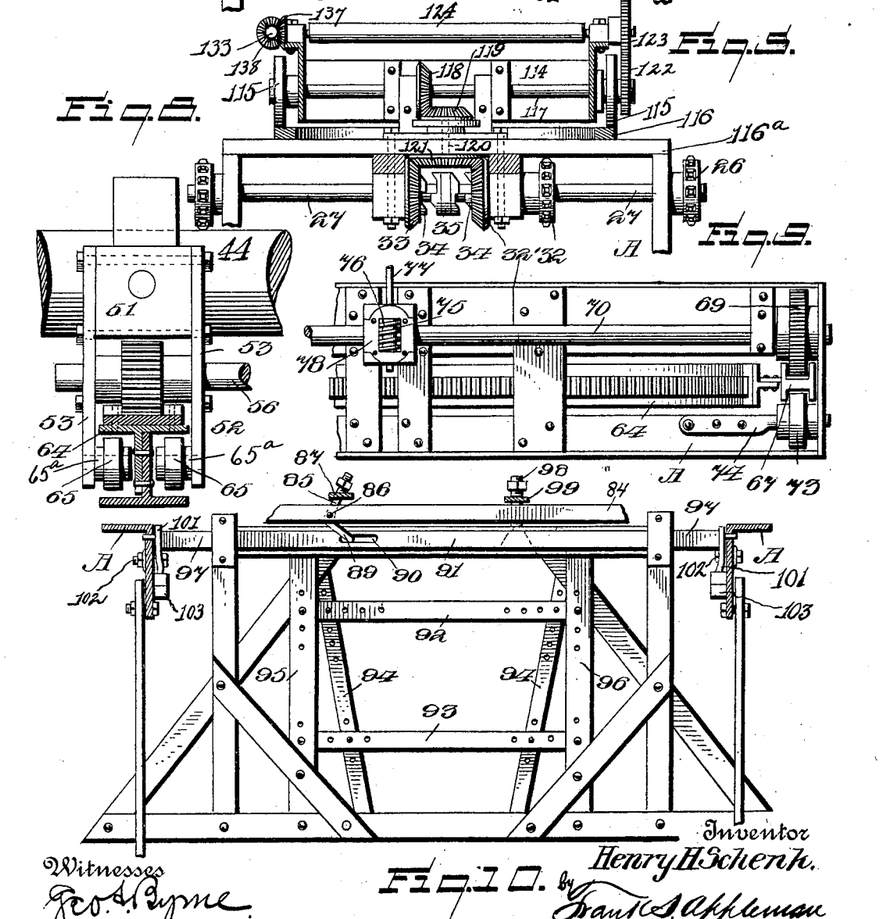
Fig. 5 is a sectional view on the line $y\, y$ of Fig. 1, showing the elevator-platform and operating mechanism in elevation.
Fig. 8 is a sectional view on the line $x\, x$ of Fig. 7.
Fig. 9 is a top plan view of the frame shown in Fig. 7.
Fig. 10 is a movable frame actuated by the shaft of the cutter-head, whereby the gearing of the auger-shifting mechanism is controlled.
Figures 6, 7:
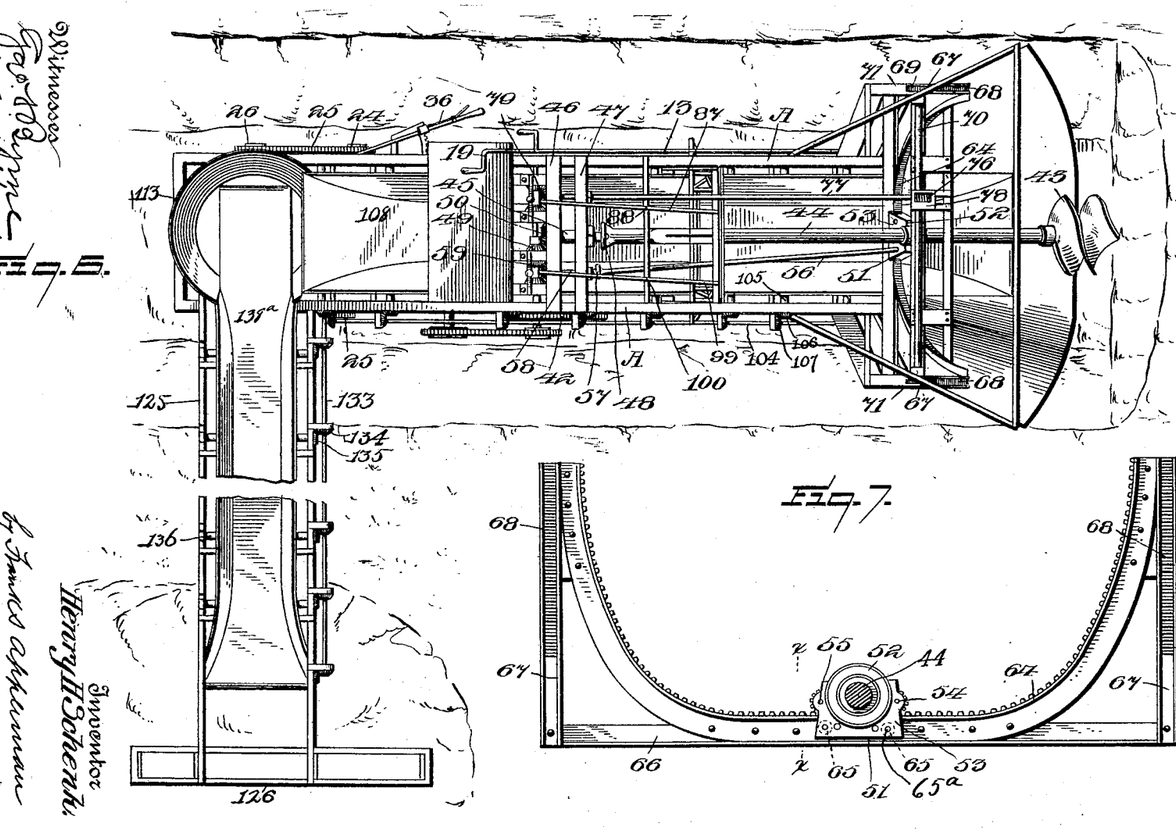
Fig. 6 is a plan view of the excavating-machine and conveyer.
Fig. 7 is a detail view of one of the frames whereby the shaft of the cutter-head is shifted.
Figure 11:
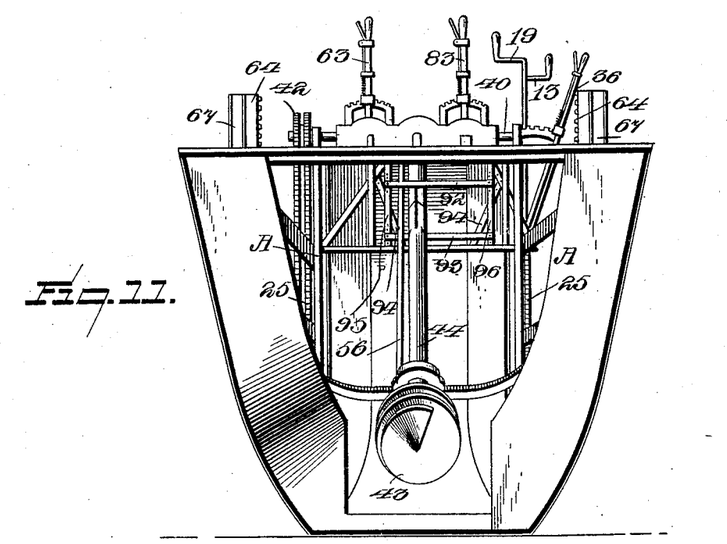
Fig. 11 is a view in elevation of the front of the excavating-machine.
Figure 12:
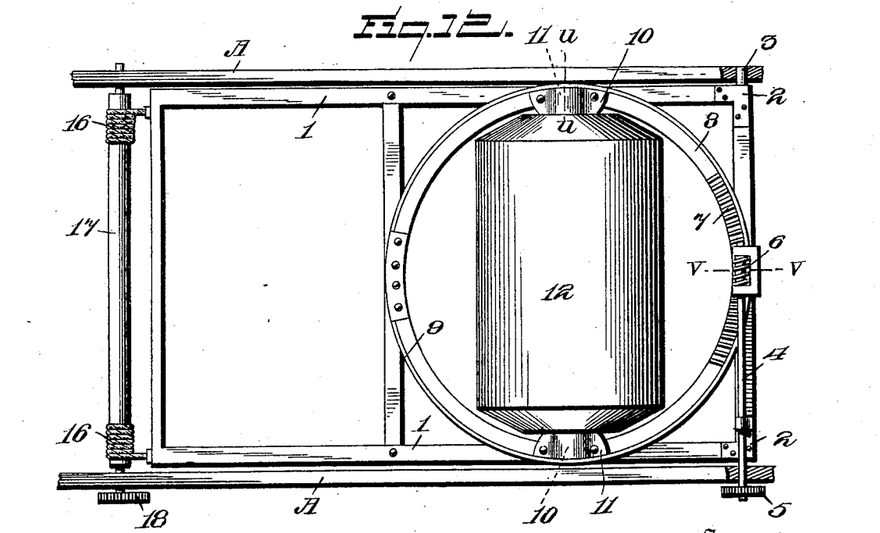
Fig. 12 is an underneath plan view of the front truck.
Figure 13:
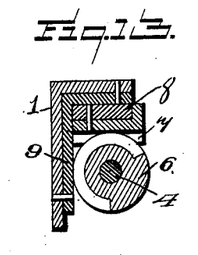
Fig. 13 is a sectional view thereof on the line V V, Fig. 12.
Figure 14:
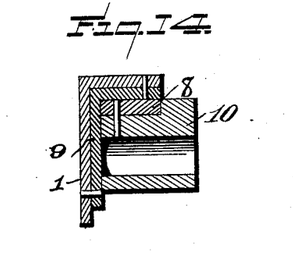
Fig. 14 is a sectional view on the line U U of Fig. 12.
Figure 16:
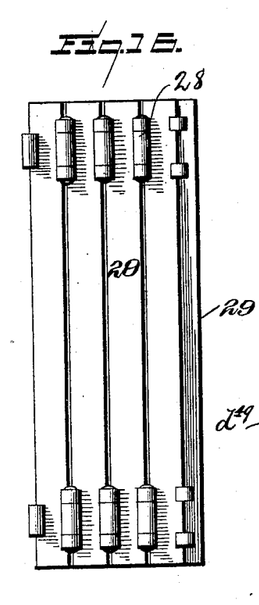
Fig. 16 is a plan view of several sections of the surface irons and connecting-links.

The material excavated is delivered rearwardly or to either side of the excavation by means of a primary and secondary conveyer. The primary conveyer is operated by means of the shaft 104, journaled in bearings attached to the frame A. A series of transversely-disposed rollers 105 are provided with gear-wheels 106, meshing with the pinion 107 on the shaft 104, by which the endless apron 108 is driven. As the cutter-head dislodges the material from the bank it drops on the endless apron and is carried rearwardly to the hopper of the secondary elevator, to be hereinafter described. The apron is caused to assume a trough-like contour in cross-section by the use of the rollers 109, set on an incline in bearings 110, suitably secured to the frame. The secondary elevator has like rollers for the same purpose. The inclination of the rollers is varied by means of the adjusting-supports 111, as fully shown in Fig. 3. The upper roller of the primary elevator and its operating parts is made adjustable with relation to the other rollers by means of the bolt 112 for the purpose of tightening the apron when required. The hopper 113 of the secondary elevator is carried by a truck 114, with guides 115ª secured to truck 114 to prevent said truck from slipping off track 116, said truck having wheels 115, which travel on a circular track 116 of a supporting-frame 116ª, two of said wheels being rotatable on the shaft 117. A gear-wheel 118 on the shaft 117 takes motion from the pinion 119 of the shaft 120, gear-wheels 121, and wheels 32' 32. On the outer end of the shaft 117 is a pinion 122, meshing with a wheel 123, said wheel 123 being secured on a shaft of a roller 124. The secondary-elevator frame 125 has one end secured to the truck 114, and its outer end is provided with a supporting-truck 126, adapted to travel on the spoil-bank. One wheel of the truck is of greater diameter than the other for the purpose of adapting itself to the inclination of the spoil-bank. If desired, one of the wheels may be made adjustable to further compensate for the said inclination. In use the larger wheel would be below the smaller one. Otherwise the conveyer would sag to the incline of the spoil-banks. Cables 127, secured to each side of truck 114, operate over pulleys 128 and are wound by crank 130ª on drum 129, secured to derrick 130. Other cables 127ª, secured to top of derrick, extend to a point near the outer end of the first section of the elevator and support same, thereby adjusting the first section of the secondary elevator to any desired height. Truss-rods 131 extend from one end of the elevator to the other and support the posts 132.

A power-shaft 133 is journaled in bearings along one side of the elevator, and pinions 134 thereon mesh with gear-wheels 135 of the transverse rollers 136. The shaft 133 is operated through the medium of the roller 124, heretofore described, which has a pinion 137, meshing with a gear-wheel 138 on the shaft 133. The secondary elevator is provided with a series of inclined rollers 109 (similar in all respects to those described in connection with the primary elevator) for giving the apron 139ᵃ of the secondary elevator a trough shape. Journal-boxes 139 are provided along the secondary elevator for the rollers 136.

Figures 17, 18:
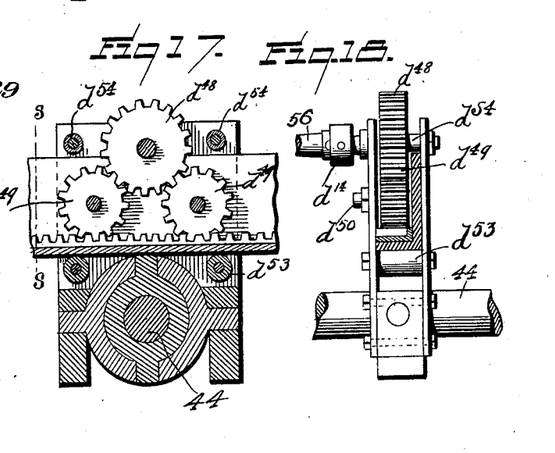
Fig. 17 is a sectional view of a modified combination for controlling the movement of the cutter.
Fig. 18 is a sectional view on a line corresponding with line S S of Fig. 17.

In Figs. 17 and 18 I show a modified construction for shifting the cutter-head. In this construction the pinion $d^{48}$ takes motion from the shaft 56 through the knuckle $d^{14}$ and shaft 15 and meshes with the pinions $d^{49}$, mounted on short shaft $d^{50}$, said pinion $d^{49}$ engaging the rack-bar 64 and causing the movement of the carriage. Rollers $d^{53}$ and $d^{54}$ are provided as guides for the shifting frame.

The construction, operation, and advantages will, it is thought, be understood from the foregoing description, it being noted that changes in the proportions and details of construction may be resorted to without departing from the spirit of the invention or the scope of the claims.

Having thus fully described my invention, what I claim as new, and desire to secure by Letters Patent, is—

1. In an excavating-machine, the combination of a cutter-head a bearing for the shaft, a bearing for the shaft movable transversely of the machine, means for carrying the bearing vertically and means for automatically directing the transverse and vertical movement of the shaft.

2. The combination in an excavating-machine of a shaft for the cutter-head, a bearing for the shaft, a curved rack on which the bearing is movable, means for directing and propelling the bearing on the rack and means for moving the rack vertically.

3. The combination in an excavating-machine of a shaft for the cutter-head, a bearing for the shaft, a rack on which the bearing is movable, a removable frame to which the rack is secured, and a shifting frame for directing the movement of the bearing and rack-supporting frame.

4. The combination in an excavating-machine of a shaft for the cutter-head, a movable bearing in which the shaft rotates, a rack on which the bearing travels, pinions journaled in the bearing and traveling on the rack, a shaft on which one of the pinions is mounted, gearing for rotating the shaft in opposite directions, a clutch for controlling the direction of rotation, a frame shifted by the action of the shaft and a lever connected with the clutch and operated by the frame.

5. In combination, a shaft on which a cutter-head is mounted, a movable bearing for the shaft, a rack on which the bearing travels, a pinion carried by the bearing for engaging the rack, a shaft for operating the pinion, gearing for rotating and changing the direction of rotation of the pinion-shaft, a frame carrying the rack, said frame having a rack, pinions engaging the rack of the frame, a shaft on which the pinions are mounted, a worm-wheel on the shaft, a worm meshing with the worm-wheel, gearing for driving and changing the rotation of the shaft of the pinion for operating the bearing and the shaft of the worm, frames actuated transversely and vertically by the cutter-shaft, levers operated by the shifting frame and clutches to which the levers are connected and by which the direction of rotation of the shafts is determined.

6. In an excavator, a frame on which the operating parts are supported, a front truck having trunnions on which the frame rests, a ground-wheel for supporting said truck, a circular bar slidable in the truck-frame, bearings for the ground-wheel attached to said frame, a rack on the bar, and a worm suitably operated for engaging the rack and reciprocating the bar.

7. In an excavator, a truck having trunnions by which the frame of the excavator is supported, a circular bar slidable in the truck-frame, a ground-wheel mounted in bearings on the circular bar, cables secured to the rear of the truck-frame, a drum for winding the cables and means for rotating the drum.

8. In an excavating-machine the combination of the shaft for the cutter-head, a movable support for the shaft, a rack-bar on which the support travels, said rack-bar being approximately T-shaped in cross-section, and rolls carried by the movable support for engaging the under surfaces of the head of the rack-bar.

9. In an excavating-machine, a shifting frame actuated by the shaft of the cutter-head, means for guiding the shaft, and means connected with the shifting frame and clutches of the power-transmitting mechanism for altering the direction of rotation of the shaft-guiding means.

10. In an excavating-machine, a shifting frame actuated by the shaft of the cutter-head, a bell-crank operated by the frame, a lever suitably pivoted, moved by the bell-crank, a clutch on the opposite end of the lever, gearing controlled by the clutch a shaft rotated by the gearing, a support for the shaft of the cutter-head actuated by the first-named shaft, a second lever under the control of the shifting frame, a clutch to which the second lever is connected, gearing controlled thereby, a shaft rotated by the gearing and means whereby the rotation of the last-named shaft moves the cutter-head vertically.

11. In an excavating-machine, a suitable shaft for the cutter-head, shafts for controlling the movement transversely and vertically of the shaft of the cutter-head, gearing for rotating the second-named shafts, clutches for altering the direction of rotation of the gearing, levers for actuating the clutches, and a shifting frame under control of the shaft of the cutter-head.

12. In an excavating-machine, a suitable shaft for the cutter-head, shafts for controlling the movement tranversely and vertically of the shaft of the cutter-head, gearing for rotating the second-named shafts, clutches for altering the direction of rotation of the gearing, levers for actuating the clutches, a shifting frame under the control of the shaft of the cutter-head, a bell-crank lever actuated by the shifting frame and connected to one of the levers whereby one of the clutches is thrown by the vertical movement of the frame, and an arm carried by the frame and connected to one of the other levers whereby the transverse movement of the frame actuates a clutch.

13. In an excavating-machine a suitable shaft for the cutter-head, shafts for controlling the movement transversely and vertically of the shaft of the cutter-head, gearing for rotating the second-named shafts, clutches for altering the direction of rotation of the gearing, levers for actuating the clutches, a shifting frame under control of the shaft of the cutter-head; said frame comprising a vertically-movable beam, an upper rail slidable on the beam, and a number of bars suitably connected.

14. In combination with the cutter-shaft of the cutter-head and the means for shifting the position of the cutter-head, a vertically-movable transversely-disposed beam of the shifting frame, a rail slidable in the beam, and a series of adjustable bars comprising a portion of the shifting frame, and shafts connected with the mechanism for shifting the cutter-head, and means under the control of the shifting frame for controlling the direction of rotation of the shafts.

15. In an excavating-machine, a secondary elevator mounted to oscillate at the rear of the primary elevator and a truck for supporting the end of the secondary elevator having one wheel of greater diameter than the other.

16. In an elevator adapted to have its end supported on a spoil-bank, a truck on the outer end of the elevator and means whereby said truck adapts itself to the inclination of the spoil-bank.

17. In an excavating-machine, a primary elevator, a hopper mounted on a truck at the rear of the primary elevator, a secondary elevator extending from the hopper, a conveyer-apron for the secondary elevator, and means for operating the apron while the secondary elevator is being oscillated.

18. In an elevator for excavating-machines, a truck mounted on a circular track, cables extending from the truck to the outer end of the derrick, the derrick having a windlass on which the cable is wound, other cables extending to the outer end of the secondary elevator for supporting same as shown and described.

19. In an excavating-machine, a truck for the secondary elevator, a shaft longitudinally of the secondary elevator, transversely-mounted rollers, geared to the longitudinal shaft, means for rotating the longitudinal shaft, cables extending from the derrick to the outer end of the elevator, means for adjusting the cables, and a carriage on the outer end of the truck supported by wheels of different sizes, as and for the purpose set forth.

HENRY H. SCHENK.

Witnesses:
J. A. LONG,
T. S. WISE.